US005411675A

United States Patent [19]

Usuki et al.

[11] Patent Number: 5,411,675

[45] Date of Patent: May 2, 1995

[54] POLYMER SCALE PREVENTIVE AGENT, POLYMERIZATION VESSEL EFFECTIVE IN PREVENTING POLYMER SCALE DEPOSITION, AND PROCESS OF PRODUCING POLYMER USING SAID VESSEL

[75] Inventors: Masahiro Usuki, Ibaraki; Susumu Ueno, Hazaki, both of Japan

[73] Assignee: Shin-Etsu Chemical Co., Ltd., Tokyo, Japan

[21] Appl. No.: 950,228

[22] Filed: Sep. 24, 1992

[30] Foreign Application Priority Data

Sep. 24, 1991 [JP] Japan .................................. 3-271948
Sep. 24, 1991 [JP] Japan .................................. 3-271949

[51] Int. Cl.$^6$ .................................. C09D 5/16
[52] U.S. Cl. .................................. 252/181; 210/698; 526/62
[58] Field of Search .................................. 252/181; 210/698; 526/62

[56] References Cited

U.S. PATENT DOCUMENTS

| | | | |
|---|---|---|---|
| 4,758,639 | 7/1988 | Koyanagi | 526/62 |
| 4,970,278 | 11/1990 | Komabashiri et al. | 526/62 |

FOREIGN PATENT DOCUMENTS

| | | |
|---|---|---|
| 1062293 | 4/1984 | European Pat. Off. . |
| 0317306 | 5/1989 | European Pat. Off. . |
| 2383199 | 10/1978 | France . |
| 45-30343 | 1/1970 | Japan . |
| 45-30835 | 1/1970 | Japan . |
| 51-59887 | 5/1976 | Japan . |
| 52-24953 | 7/1977 | Japan . |
| 55054317 | 4/1980 | Japan . |
| 61-051002 | 3/1986 | Japan . |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A polymer scale preventive agent for use in polymerization of a monomer having an ethylenically unsaturated double bond, comprising:

(A) at least one compound selected from the group consisting of diaminobenzenes and diaminonaphthalenes, (B) a hydroxynaphthoquinone, and (C) an acid. The polymerization vessel having a coating comprising the polymer scale preventive agent on its inner wall, etc. is effective in preventing deposition of polymer scale, and the polymeric product has a high whiteness and is of high quality.

9 Claims, No Drawings

POLYMER SCALE PREVENTIVE AGENT, POLYMERIZATION VESSEL EFFECTIVE IN PREVENTING POLYMER SCALE DEPOSITION, AND PROCESS OF PRODUCING POLYMER USING SAID VESSEL

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel. 2. Description of the Prior Art In processes of preparing polymers by polymerizing a monomer in a polymerization vessel, the problem that polymer deposits on the inner wall surfaces and so forth in the form of scale, is known. The deposition of the polymer scale on the inner wall results in disadvantages that the yield of the polymer and cooling capacity of the polymerization vessel are lowered; that the polymer scale may peel and mix into a polymeric product, thereby impairing the quality of the polymeric product; and that removal of such polymer scale is laborious and hence time-consuming. Further, since the polymer scale contains unreacted monomers and operators may be exposed thereto, which may cause physical disorders in the operators.

Heretofore, as methods for preventing polymer scale deposition on the inner wall surface and so forth of a polymerization vessel in polymerization of a monomer having an ethylenically unsaturated double bond, methods in which substances exemplified below are coated on the inner wall surface, etc. as a scale preventive agent, have been known.

For example, particular polar organic compounds (Japanese Patent Publication (KOKOKU) No. 45-30343(1970)), a dye or pigment (Japanese Patent Publication (KOKOKU) Nos. 45-30835(1970) and 52-24953(1977)), an aromatic amine compound (Japanese Pre-examination Patent Publication (KOKAI) No. 51-50887(1976) and a reaction product of a phenolic compound and an aromatic aldehyde (Japanese Pre-examination Patent publication (KOKAI) No. 55-54317(1980)) are disclosed.

The scale preventive agents containing the polar organic compounds described in Japanese Patent Publication (KOKOKU) No. 45-30343(1960), the dyes or pigments described in Japanese Patent Publication (KOKOKU) Nos. 45-30835(1960) and 52-24953(1977) are effective in the polymerization of vinyl halides such as vinyl chloride or monomeric mixture containing a vinyl halide as a major component and a small amount of monomers copolymerizable therewith; however, it is difficult to effectively prevent the deposition of polymer scale in the polymerization of vinyl acetate, acrylates, acrylonitrile, styrene, α-methylstyrene or like monomers because these show a strong dissolving action against the coatings formed from the scale preventive agents above.

In the meantime, vinyl chloride polymers obtained by polymerization are required to have a good witness. That is, when polymeric products such as vinyl chloride polymers are formed or molded with no addition of a coloring agent, the resulting formed or molded product is colored more or less. This coloration is called initial coloration, which is required to be as low as possible.

However, in the case where vinyl chloride or the like is suspension polymerized in a polymerization vessel in which a polymer scale preventive agent comprising the substances mentioned above has been coated, polymeric products obtained are more or less colored and their quality is low. Presumably, the coloration is due to the fact that most of the conventional polymer scale preventive agents are colored. That is, presumably, when polymerization is conducted in a polymerization vessel having the coating mentioned above, the coating is dissolved or peeled into the polymerization mass, causing the coloration of polymeric products.

SUMMARY OF THE INVENTION

An object of the present invention is to provide a polymer scale preventive agent that can prevent effectively the deposition of polymer scale on a polymerization vessel in polymerizing a monomer having an ethylenically unsaturated double bond and can produce a polymer with little coloration and of high quality, a polymerization vessel using the same, and a process of producing a polymer using the vessel.

That is, the present invention provides, as a means of achieving the above object, a polymer scale preventive agent for use in polymerization of a monomer having an ethylenically unsaturated double bond, comprising:

(A) at least one compound selected from the group consisting of diaminobenzenes and diaminonaphthalenes, (B) a hydroxynaphthoquinone, and (C) an acid.

The present invention also provides a polymerization vessel for use in polymerization of a monomer having an ethylenically unsaturated double bond, having on its inner wall surfaces a polymer scale preventive coating, wherein said coating has been formed by applying a coating liquid comprising:

(A) at least one compound selected from the group consisting of diaminobenzenes and diaminonaphthalenes, (B) a hydroxynaphthoquinone, and (C) an acid to the inner wall surfaces, followed by drying.

Further, the present invention provides a process of producing a polymer of an ethylenically unsaturated double bond, which comprises polymerizing the monomer in a polymerization vessel having a polymer scale preventive coating on its inner wall surfaces, wherein said coating has been formed by applying a coating liquid comprising:

(A) at least one compound selected from the group consisting of diaminobenzenes and diaminonaphthalenes, (B) a hydroxynaphthoquinone, and (C) an acid to the inner wall surfaces, followed by drying.

According to the present invention, polymeric products with high whiteness free from coloration can be produced because the polymer scale preventive coating is light in color and hard to be dissolved. Specifically, formed or molded products produced from the polymeric products exhibit a luminosity index L in the Hunter's color difference equation described in JIS Z 8730(1980) of 70.0 or more in the case of vinyl chloride polymers and 80.0 or more in the case of ABS copolymer resin, for instance.

Further, polymer scale deposition can be effectively prevented. The scale prevention can be effected even in the polymerization of monomers having a strong dissolving action against the conventional polymer scale preventive coatings and in the polymerization carried out in a stainless steel polymerization vessel in which polymer scale deposition is liable to occur.

Furthermore, the operation of forming the coating may be conducted every several polymerization runs or every 10 to 20 polymerization runs. Since the operation of removing polymer scale is not required to be conducted often every polymerization run, productivity is improved.

DETAILED DESCRIPTION OF PREFERRED EMBODIMENTS

(A) Diaminobenzenes and Diaminonaphthalenes

The component (A) of the present polymer scale preventive agent comprises at least one compound selected from the group consisting of diaminobenzenes and diaminonaphthalenes having two amino groups.

Diaminobenzenes are represented by the general formula (1):

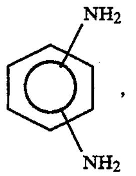

(1)

and include, for example, 1,3-diaminobenzene and 1,4-diaminobenzene.

Diaminonaphthalenes are represented by the general formula (2a ) or (2b ):

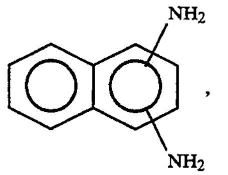

(2a)

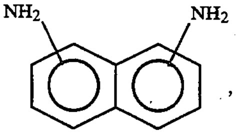

(2b)

and include, for example, 1,2-diaminonaphthalene, 1,4-diaminonaphthalene, 1,5-diaminonaphthalene, 1,8-diaminonaphthalene, 2,3-diaminonaphthalene, 2,6-diaminonaphthalene, 2,7-diaminonaphthalene and the like.

Incidentally, diaminoanthraquinones are not favorable because most of them are deeply colored and cause coloration of polymeric products.

Among the diaminobenzens and diaminonaphthalenes above, preferred are diaminonaphthalenes. Particularly preferred are 1,8-diaminonaphthalene, 1,4-diaminonaphthalene and 2,7-diaminonaphthalene.

The diaminobenzenes and the diaminonaphthalenes can be used singly or in combination of two or more.

(B) Hydroxynaphthoquinone

The hydroxynaphthoquinone compound of the component (B) of the present polymer scale preventive agent has at least one hydroxy group, and may have other substituents than the hydroxy group. The hydroxynaphthoquinone compound is generally represented by the general formula (3):

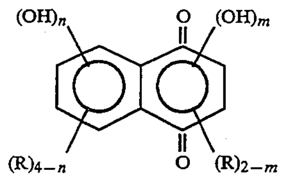

(3)

wherein R is at least one group selected from the group consisting of $C_1$ to $C_4$ alkyl groups such as methyl, ethyl, n-propyl, i-propyl, n-butyl, i-butyl, sec-butyl, tert-butyl and the like, a hydrogen atom, a chlorine atom, a bromine atom, —NO, —CHO, —SH, $-NO_2$, —COOH, a vinyl group, a phenyl group and $-NH_2$; where there exist two or more R's, they may be the same or different, m is an integer of 0 to 2, and n is an integer of 0 to 4, provided that m+n is 1 or more.

The hydroxynaphthoquinone compound includes, for example, 2-hydroxy-1,4-naphthoquinone, 2-hydroxy-3-methyl-1,4-naphthoquinone, 2-hydroxy-3-ethyl-1,4-naphthoquinone, 2-hydroxy-6,7-dimethyl-1,4-naphthoquinone, 2-hydroxy-6-methyl-1,4-naphthoquinone, 6-methyl-2-hydroxy-3-ethyl-1,4-naphthoquinone, 6-chloro-2-hydroxy-1,4-naphthoquinone, 6-chloro-2-hydroxy-3-methyl-1,4-naphthoquinone, 5,8-dihydroxy-1,4-naphthoquinone, 2,6-dihydroxy-1,4-naphthoquinone and the like. These may be used singly or in combination of two or more.

Among these compounds above, preferred are 2-hydroxy-1,4-naphthoquinone, 6-chloro-2-hydroxy-1,4-naphthoquinone and 5,8-dihydroxy-1,4-naphthoquinone.

(C) Acid

The acid of the component (C) of the present polymer scale preventive agent may be any of organic acids and inorganic acids, and may be a mixture of the both. The acid includes, for example, sulfuric acid, hydrochloric acid, phosphoric acid, nitric acid, carbonic acid, perchloric acid, molybdic acid, tungstic acid, phosphomolybdic acid, silicomolybdic acid, phosphotungstic acid, silicotungstic acid, formic acid, acetic acid, oxalic acid, lactic acid, maleic acid, glycolic acid, thioglycolic acid, p-toluenesulfonic acid, tannic acid, and phytic acid. These acids may be used singly or in combination of two or more.

Among the acids above, preferred are phosphoric acid, oxalic acid, acetic acid, molybdic acid, tungstic acid, phosphomolybdic acid, phosphotungstic acid, silicomolybdic acid, silicotungstic acid, phytic acid and tannic acid.

The organic acid or inorganic acids is desirably dissolved to form an aqueous solution with a suitable concentration prior to the preparation of a coating liquid.

The amount of the component (B) in the present polymer scale preventive agent is preferably in the range of 1 to 10,000 parts by weight, more preferably in the range of 5 to 2,000 parts by weight per 100 parts by weight of the component (A). The amount of the component (C) is preferably in the range of 0.01 to 5,000 parts by weight, preferably in the range of 0.01 to 1,000 parts by weight per 100 parts by weight of the component (A). If any of the amounts of the components (A), (B) and (C) is unsuitable, when a coating liquid is prepared as described later, the coating liquid is unstable and therefore the components (A) and (B) may form a sediment therein. The poor stability of the coating liquid makes it difficult to form a good coating on the inner wall surfaces etc. of a polymerization vessel, resulting in that the number of polymerization runs that can be repeated without deposition of polymer scale is decreased.

The polymer scale preventive agent of the present invention can be prepared by mixing said components (A), (B) and (C). The polymer scale preventive agent is used for forming a coating on, for example, the inner wall surfaces of a polymerization vessel, and the deposition of polymer scale is thereby prevented. Where such a coating is formed, the mixture system of the components (A) to (C) is prepared in a liquid state, specifically as a solution or a dispersion. That is, the mixture system is used as a coating liquid.

Preparation of Coating Liquid

The coating liquid mentioned above is prepared by dissolving or dispersing the components (A) to (C) in a suitable solvent to form a solution or dispersion. The coating liquid is preferably a solution so that a good coating can be formed on the inner wall surfaces and like of a polymerization vessel.

Specifically, the coating liquid containing the components (A) to (C) can be prepared, for example, by dissolving components (A) and (B) in a suitable solvent to form a solution, and adding a component (C) to the solution, followed by mixing.

The total concentration of the components (A) to (C) is not limited as long as a total coating weight after drying described later can be obtained. Normally, the total concentration is in the range of 0.001 to 5% by weight, preferably 0.001 to 2% by weight.

To the coating liquid described above is preferably added (D) a silica sol, which can enhance the durability of the coating of the scale preventive agent formed on the inner wall surfaces, etc. and the resistance of the coating against dissolution by the monomer.

(D) Silica Sol

The silica sol of the component (D) of the present invention is a dispersion of silica in a suitable medium. The dispersed silica normally has a particle diameter of 2 to 200 nm, preferably 2 to 50 nm, and most preferably 2 to 20 nm.

The dispersion medium for the silica sol includes, for example, water, alcohol solvents such as methanol, ethanol, i-propanol, n-propanol, n-butanol, i-butanol, ethylene glycol, methyl cellosolve, and the like, dimethylformamide, dimethylacetamide and dimethyl sulfoxide. Among these, preferred are water, and alcohol solvents such as methanol, n-butanol and ethylene glycol.

The viscosity at 25° C. of the silica sol ranges normally from 1 to 100 cP, preferably from 1 to 20 cP, most preferably from 1 to 5 cP. The content of the dispersed silica in the silica sol (D) is preferably from 10 to 50% by weight, more preferably from 10 to 30% by weight.

The component (D) may be added to a solution or dispersion in which the components (A) to (C) have been dissolved or dispersed, followed by mixing. The amount of the component (D) ranges preferably from 1 to 10,000 parts by weight, more preferably from 10 to 1,000 parts by weight per 100 parts by weight of the total of the components (A) to (C). The concentration of the component (D) in the coating solution preferably ranges from 0.01 to 10% by weight, more preferably from 0.1 to 5% by weight.

Solvents to be used for preparation of the coating liquid containing the scale preventive agent of the present invention include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; ethers such as 4-methyldioxolane, ethylene glycol diethyl ether, etc.; esters such as methyl formate, ethyl formate, methyl acetate, methyl acetoacetate, etc.; furans such as tetrahydrofuran, furfural, furfuryl alcohol, and tetrahydrofurfuryl alcohol; aliphatic hydrocarbons such as n-hexane, and n-heptane; aromatic hydrocarbons such as toluene, benzene, and xylene; halogenated hydrocarbons such as methylene chloride, 1-chlorobutane, amyl chloride, ethylene dichlorides, and 1,1,2-trichlroethane; and aprotic solvents such as acetonitrile, formaldehyde, dimethylformamide, dimethyl sulfoxide, and N-methylpyrrolidone. These solvents may be used singly or as a mixed solvent of two or more thereof as appropriate. Among the solvents above, particularly preferred are water, alcohols such as methanol and ethanol and mixed solvents thereof. Particularly, where a coating liquid containing the components (A) to (D) is prepared, a mixture of water and an alcohol is preferred. In that case, the amount of water is preferably 90% by weight or less, and more preferably 50% by weight or less.

Formation of the Coating

The coating liquid is applied to the inner walls of a polymerization vessel and then dried sufficiently at a temperature from room temperature to 100° C., for instance, followed by washing with water if necessary, to form the coating. The drying may be carried out.

The coating liquid is preferably applied to not only the inner wall surfaces of a polymerization vessel but also other areas with which the monomer comes into contact during polymerization to form the coating on such areas. For example, it is preferred to form the coating on a stirring shaft, stirring blades, condensers, headers, search coil, bolts, nuts, etc.

More preferably, for formation of the coating, the coating liquid is applied to areas with which monomers does not come into contact during polymerization but on which polymer scale may deposit, for example, the areas with which unreacted monomers comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the coating liquid is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the coating liquid, is not limited, either. Following methods can be used. That is, a method in which, after the liquid is applied, hot air with an suitable elevated temperature is blown to the coated surface, and a method in which the inner wall surface of a polymerization vessel and the surfaces of other parts to be coated are previously heated to from 30° to 80° C., and the polymer scale preventive liquid is directly applied to the heated inner wall surfaces, etc. After dried, the coated surfaces are washed with water if necessary.

The coating thus obtained normally has a coating weight of normally 0.001 $g/m^2$ to 5 $g/m^2$, and preferably from 0.001 to 3 $g/m^2$.

The coating operation may be conducted every one to ten-odd batches of polymerization. The formed coating has good durability and retains the scale-preventing action; therefore the coating operation may be performed every several batches of polymerization. Thus, the polymerization can be used repeatedly without deposition of polymer scale on the inner wall etc., and productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomers having an ethylenically unsaturated double bond to which this invention can be applied may include, for example, vinyl halides such as vinyl chloride; vinyl esters such as vinyl acetate and vinyl propionate; vinylidene halides such as vinylidene chloride; acrylic acid, methacrylic acid, and esters or salts thereof; and diene monomers such as butadiene, chloroprene and isoprene; as well as styrene, α-methylstyrene, acrylonitrile, and vinyl ethers. These may be used singly or in combination of two or more.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to polymerizations in an aqueous medium such as suspension or emulsion polymerization.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 $kgf/cm^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 $kgf/cm^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization.

The present invention makes it possible to prevent polymer scale from depositing, independent of materials constituting the inner wall, etc. of a polymerization vessel. For example, this invention can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

The polymerizations to which the present invention is particularly suitable, include for example emulsion polymerization or suspension polymerization for producing vinyl chloride polymers, vinyl chloride-vinyl acetate copolymers, styrene-acrylic acid or styrene-acrylate copolymers, styrene-methacrylic acid or styrene-methacrylate copolymers, polystyrene, ABS copolymer resin, and synthetic rubbers such as SBR, NBR, CR, IR, IIR or the like, as well as vinyl acetate emulsions and acrylic emulsions.

EXAMPLES

The working examples of the present invention will now be described below. In each table below, the coating liquids and experiments marked with * are comparative examples and the other coating liquids and experiments are working examples of the present invention.

EXAMPLE 1

Preparation 1 of Coating Liquids

(Coating Liquid Nos. 1–20)

In the preparation of each coating liquid, as shown in Table 1, a diamine compound (A-1) was dissolved or dispersed as a component (A) in a solvent so that the concentration thereof became 0.1% by weight. A hydroxynaphthoquinone compound as a component (B) was then added, followed by mixing. To the resulting liquid, an organic acid or an inorganic acid as a component (C) was added. The liquid was mixed with stirring, and optionally a diamine compound (A-2) as another component (A) was added to the liquid, followed by mixing.

In Table 1 are given the kinds of the components (A) to (C), the weight ratio of (B)/(A), the weight ratio of (C)/(A) and the solvent employed in each coating liquid.

It is noted that Coating solution No. 19 dose not meet the requirements of the present invention because C.I. Acid Black 2 was used in place of the component (A) as specified above; and Coating Solution No. 20 dose not meet the requirements of the present invention because Condensate No. 17 described in Japanese Patent Publication (KOKOKU) No. 60-30681 (1985) was used in place of the component (A) as specified above.

TABLE 1

| No. of coating liquid | (A) Diamine (A-1) | (A-2) | A-1:A-2 wt. ratio | (B) Hydroxynaphthoquinone compound | (A):(B) wt. ratio | (C) Organic acid or Inorganic acid | (A):(C) wt. ratio | solvent |
|---|---|---|---|---|---|---|---|---|
| 1* | 2,3-diamino-naphthalene | — | — | — | — | — | — | Methanol |
| 2* | 2,3-diamino-naphthalene | — | — | 2-hydroxy-1,4-naphthoquinone | 100:100 | — | — | Methanol |
| 3 | 1,4-diaminobenzene | — | — | 2-hydroxy-1,4-naphthoquinone | 100:100 | Phosphomolybdic acid | 100:30 | Methanol |
| 4* | 1,4-diaminobenzene | 1,4-diamino-benzene | 100:100 | — | — | Carbonic acid | 100:100 | Methanol |
| 5 | 2,7-diamino-naphthalene | 1,2-diamino-naphthalene | 100:100 | 2-hydroxy-6,7-dimethyl-1,4-naphthoquinone | 100:75 | p-Toluene-sulfonic acid | 100:75 | Methanol |
| 6 | 2,7-diamino-naphthalene | 2,7-diamino-naphthalene | 100:100 | 5,8-dihydroxy-1,4-naphthoquinone | 100:50 | Silicotungstic acid | 100:25 | Methanol |
| 7 | 2,7-diamino-naphthalene | 2,7-diamino-naphthalene | 100:200 | 2-hydroxy-3-methyl-1,4-naphthoquinone | 100:33 | Molybdic acid | 100:10 | Methanol |
| 8 | 2,7-diamino-naphthalene | 2,7-diamino-naphthalene | 100:200 | 2-hydroxy-1,4-naphthoquinone | 100:33 | Tannic acid | 100:65 | Methanol |
| 9 | 1,4-diamino-naphthalene | — | — | 5,8-dihydroxy-1,4-naphthoquinone | 100:100 | Phosphoric acid | 100:100 | Ethanol |
| 10 | 1,4-diamino-naphthalene | 1,3-diamino-benzene | 100:150 | 5,8-dihydroxy-1,4-naphthoquinone | 100:40 | Phosphoric acid | 100:40 | Ethanol |
| 11 | 1,4-diamino-naphthalene | 2,7-diamino-naphthalene | 100:150 | 5,8-dihydroxy-1,4-naphthoquinone | 100:20 | Phosphoric acid | 100:40 | Ethanol |
| 12 | 1,4-diamino-naphthalene | 1,4-diamino-naphthalene | 100:100 | 6-chloro-2-hydroxy-1,4-naphthoquinone | 100:75 | Tannic acid | 100:75 | Ethanol |
| 13 | 1,4-diamino-naphthalene | 1,2-diamino-naphthalene | 100:100 | 6-chloro-2-hydroxy-1,4-naphthoquinone | 100:75 | Tungstic acid | 100:40 | Ethanol |
| 14 | 1,8-diamino-naphthalene | — | — | 2-hydroxy-1,4-naphthoquinone | 100:100 | Phytic acid | 100:100 | Methanol |
| 15 | 1,8-diamino-naphthalene | — | — | 2-hydroxy-1,4-naphthoquinone | 100:100 | Phosphoric acid | 100:50 | Methanol |
| 16 | 1,8-diamino-naphthalene | 1,8-diamino-naphthalene | 100:200 | 2-hydroxy-1,4-naphthoquinone | 100:33 | Acetic acid | 100:17 | Methanol |
| 17 | 1,8-diamino-naphthalene | 1,8-diamino-naphthalene | 100:200 | 2-hydroxy-1,4-naphthoquinone | 100:33 | Oxalic acid | 100:17 | Ethanol |
| 18 | 1,8-diamino-naphthalene | 1,5-diamino-naphthalene | 100:200 | 2-hydroxy-1,4-naphthoquinone | 100:33 | Phytic acid | 100:17 | Ethanol |
| 19* | C.I. Acid Black 2 | — | — | — | — | Phosphoric acid | 100:100 | Methanol |
| 20* | Condensation product No. XVII[(1)] | — | — | — | — | Phosphoric acid | 100:100 | Methanol |

Remarks: [(1)]The condensation product is disclosed in Japanese Patent Publication (KOKOKU) No. 60-30681 (1985).

EXAMPLE 2

(Experiment Nos. 101 to 112)

In each experiment, a coating liquid specified in Table 2 was applied by means of a spraying apparatus to the inner wall, the stirring shaft, the stirring blades and other areas with which a monomer comes into contact of a stainless steel polymerization vessel with a capacity of 1,000 liter and equipped with a stirrer and jacket. The applied coating liquid was heated for 20 minutes and dried by setting the temperature of the jacket to 50° C., followed by washing with water to form a coating.

Thereafter, into the polymerization vessel in which the coating was formed as above, 450 liters of water and 5 kg of sodium dodecylbenzenesulfonate were charged, and they were dissolved under stirring. After 200 kg of vinyl chloride and 0.25 kg of ammonium peroxodisulfate were charged therein, polymerization was conducted at 70° C. for 5 hours.

After the completion of the polymerization, the amount of the polymer scale adhering to the inner wall of the polymerization vessel and the whiteness (or initial coloration) of the polymeric product obtained were measured according to the following methods.

Measurement of the Mount of Polymer Scale Deposition

The scale deposition on the inner wall surface in an area of 10 cm square was scraped off with a stainless steel spatula as completely as possible to be confirmed with naked eyes, and then the scraped scale was weighted on a balance. Thereafter, the amount of the deposited scale per area of 1 $m^2$ was obtained by multiplying the measured value by 100.

Measurement of Initial Coloration of Polymer

A hundred parts by weight of a polymer, one part by weight of a tin laurate stabilizing agent(trade name: TS-101, product of Akishima Chemical Co.) and 0.5 part by weight of a cadmium stabilizing agent (trade name: C-100J, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm ×4 cm ×1.5 cm (thickness), and molded under heating at 160° C. and under a pressure of 65 to 70 kgf/$cm^2$ to prepare a test specimen.

This test specimen was measured for luminosity index L in the Hunter's color difference equation described in JIS Z 8730 (1980). Initial coloration is evaluated to be lower with increase in L value.

The L value was determined as follows. The stimulus value Y of XYZ color system was determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 was adopted. Next, L was calculated based on the equation: $L=10Y^{\frac{1}{2}}$ described in JIS Z 8730(1980).

The results are given in Table 2.

TABLE 2

| Experiment No. | Coating solution No. | Amount of scale ($g/m^2$) | L value |
|---|---|---|---|
| 101* | — | 420 | 72.8 |
| 102* | 1* | 280 | 71.5 |
| 103* | 2* | 250 | 71.3 |
| 104* | 19* | 40 | 68.2 |
| 105* | 20* | 8 | 68.4 |
| 106 | 5 | 8 | 72.3 |
| 107 | 6 | 5 | 72.4 |
| 108 | 7 | 7 | 72.2 |
| 109 | 8 | 2 | 72.2 |
| 110 | 9 | 5 | 72.5 |
| 111 | 10 | 10 | 72.0 |
| 112 | 11 | 2 | 72.3 |

EXAMPLE 3

(Experiment Nos. 201 to 212)

In each experiment, in a stainless steel polymerization vessel with a capacity of 1,000 liter inside of which a coating had been formed in the same manner as in Example 2, were charged 350 kg of water and 35 kg of a completely saponified polyvinyl alcohol. The mixture was stirred at 90° C. for 3 hours so as to dissolve the polyvinyl alcohol. After the mixture was cooled to 40° C., 0.8 kg of oxalic acid was added thereto and then heating was started. When the temperature of the mixture rose to 45° C., 80 kg of vinyl acetate was added thereto; when it rose to 50° C., 1.7 kg of 35% aqueous hydrogen peroxide was added thereto. At the time when the temperature became 75° C., 300 kg of vinyl acetate began to be added dropwise and the addition was conducted over 3 hours. During the 2 hours after the start of the addition, 1.7 kg of the 35% aqueous hydrogen peroxide was added. Maturation reaction was carried out for 2 hours after the completion of the addition. The polyvinyl acetate emulsion thus obtained was taken out of the polymerization vessel, and the vessel was washed with water.

The amount of polymer scale deposition was measured in the same manner as in Example 2. The results are given in Table 3.

TABLE 3

| Experiment No. | Coating liquid No. | Amount of scale ($g/m^2$) |
|---|---|---|
| 201* | — | 350 |
| 202 | 3 | 10 |
| 203* | 4* | 40 |
| 204* | 19* | 32 |
| 205* | 20* | 13 |
| 206 | 12 | 5 |
| 207 | 13 | 2 |
| 208 | 14 | 10 |
| 209 | 15 | 7 |
| 210 | 16 | 3 |
| 211 | 17 | 3 |
| 212 | 18 | 6 |

EXAMPLE 4

Preparation 2 of Coating Liquids (Coating Liquid Nos. 21 to 40)

In the preparation of each coating liquid, as given in Table 4, a diamine compound as a component (A) was dissolved or dispersed in a solvent so that the concentration thereof may become 0.1% by weight, and to the resulting liquid a hydroxynaphthoquinone compound (B) was added, followed by mixing. To the liquid obtained, an organic acid or an inorganic compound (C) was added, and optionally, after mixing with stirring for 5 hours, a silica sol (D) was added, followed by mixing.

In Table 4 are given the kinds of the components (A) to (D), the weight ratio of (B)/(A), the weight ratio of (C)/(A), the weight ratio of (D)/[(A)+(B)+(C)], the solvent, the composition of the solvent employed in each experiment.

In Table 5, the silica sols used are detailed.

It is noted that C.I. Acid Black 2 and Condensate No. 17 described in Japanese Patent Publication (KOKOKU) No. 60-30681(1985) used in Coating liquid Nos. 39 and 40, respectively, do not meet the requirements for the component (A) or (B) of the present invention.

TABLE 5-continued

| Silica sol | Dispersion medium | Solid content wt. % | Particle diameter (nm) | Viscosity at 25° C. (cP) |
|---|---|---|---|---|
| j | Ethylene glycol | 20 | 10 | 80 |

*[1]chain-like particles

EXAMPLE 5

(Experiment Nos. 301 to 312)

In each experiment, a coating liquid specified in Table 2 was applied by means of a spraying apparatus to the inner wall, the stirring shaft, the stirring blades and other areas with which a monomer comes into contact of a stainless steel polymerization vessel with a capacity of 1,000 liter and equipped with a stirrer and jacket. The applied coating liquid was heated for 20 minutes and dried by setting the temperature of the jacket to 50° C. followed by washing with water to form a coating.

Thereafter, into the polymerization vessel in which the coating was formed as above, 450 liters of water and 5 kg of sodium laurylsulfonate were charged, and the sodium laurylsulfonate were dissolved under stirring. After 200 kg of vinyl chloride and 0.3 kg of potassium peroxodisulfate were charged therein, polymerization was conducted at 70° C. for 5 hours.

TABLE 4

| No. of coating liquid | (A) Diamine | (B) Hydroxy-naphtoquinone | (A):(B) wt. ratio | (C) Acid | (A):(C) wt. ratio | (D) Silica sol No. | (A) + (B) + (C):(D) wt. ratio | Solvent |
|---|---|---|---|---|---|---|---|---|
| 21* | 1,3-diaminobenzene | — | — | — | — | — | — | Water/Methanol (0:100) |
| 22* | 1-3,diaminobenzene | 5,8-dihydroxy-1,4-naphthoquinone | 100:100 | — | — | i | 100:200 | Water/Methanol (0:100) |
| 23* | 1,5-diaminonaphthalene | — | — | Tannic acid | 100:200 | a | 100:100 | Water/Methanol (30:70) |
| 24 | 1,5-diaminonaphthalene | 2-hydroxy-1,4-naphthoquinone | 100:200 | Hydrochloric acid | 100:50 | — | — | Water/Methanol (0:100) |
| 25 | 1,5-diaminonaphthalene | 2-hydroxy-6,7-dimethyl-1,4-naphthoquinone | 100:100 | p-toluene-sulfonic acid | 100:300 | a | 100:80 | Water/Methanol (30:70) |
| 26 | 1,4-diaminonaphthalene | 6-chloro-2-hydroxy-1,4-naphthoquinone | 100:100 | Phospho-molybdic acid | 100:50 | a | 100:80 | Water/Methanol (30:70) |
| 27 | 1,4-diaminonaphthalene | 6-chloro-2-hydroxy-1,4-naphthoquinone | 100:100 | Molybdic acid | 100:30 | b | 100:150 | Water/Methanol (40:60) |
| 28 | 1,4-diaminonaphthalene | 6-chloro-2-hydroxy-1,4-naphthoquinone | 100:50 | Phosphoric acid | 100:50 | b | 100:150 | Water/Methanol (40:60) |
| 29 | 2,7-diaminonaphthalene | 2-hydroxy-6-methyl-1,4-naphthoquinone | 100:100 | Sulfuric acid | 100:20 | c | 100:150 | Water/Methanol (40:60) |
| 30 | 2,7-diaminonaphthalene | 2-hydroxy-3-methyl-1,4-naphthoquinone | 100:100 | Carbonic acid | 100:50 | e | 100:120 | Water/Methanol (20:80) |
| 31 | 2,7-diaminonaphthalene | 6-chloro-2-hydroxy-1,4-naphthoquinone | 100:200 | Phytic acid | 100:150 | c | 100:100 | Water/Methanol (20:80) |
| 32 | 2,7-diaminonaphthalene | 6-chloro-2-hydroxy-1,4-naphthoquinone | 100:300 | Phytic acid | 100:100 | d | 100:100 | Water/Methanol (20:80) |
| 33 | 1,8-diaminonaphthalene | 2-hydroxy-1,4-naphthoquinone | 100:10 | Phytic acid | 100:200 | g | 100:100 | Water/Methanol (20:80) |
| 34 | 1,8-diaminonaphthalene | 2-hydroxy-1,4-naphthoquinone | 100:50 | Oxalic acid | 100:50 | d | 100:200 | Water/Methanol (40:60) |
| 35 | 1,8-diaminonaphthalene | 2-hydroxy-1,4-naphthoquinone | 100:50 | Phosphoric acid | 100:100 | a | 100:100 | Water/Methanol (20:80) |
| 36 | 1,8-diaminonaphthalene | 5,8-dihydroxy-1,4-naphthoquinone | 100:10 | Acetic acid | 100:200 | h | 100:200 | Water/Methanol (0:100) |
| 37 | 1,8-diaminonaphthalene | 5,8-dihydroxy-1,4-naphthoquinone | 100:50 | Phosphoric acid | 100:100 | i | 100:200 | Water/Methanol (0:100) |
| 38 | 1,8-diaminonaphthalene | 5,8-dihydroxy-1,4-naphthoquinone | 100:100 | Phosphoric acid | 100:100 | d | 100:200 | Water/Methanol (0:100) |
| 39* | C.I. Acid Black 2 | — | — | Phosphoric acid | 100:100 | a | 100:100 | Water/Methanol (30:70) |
| 40* | Condensation product No. XVII[(1)] | — | — | Phosphoric acid | 100:100 | a | 100:100 | Water/Methanol (30:70) |

Remarks: [(1)]The condensation product is disclosed in Japanese Patent Publication (KOKOKU) No. 60-30681 (1985).

TABLE 5

| Silica sol | Dispersion medium | Solid content wt. % | Particle diameter (nm) | Viscosity at 25° C. (cP) |
|---|---|---|---|---|
| a | Water | 20 | 15 | 2 |
| b | Water | 30 | 6 | 4 |
| c | Water | 20 | 40 | 5 |
| d | Water | 15 | 5 | 10 |
| e | Water | 20 | 5 | 3 |
| f | Water | 20 | 50 | 2 |
| g | Water | 20 | 200*[1] | 80 |
| h | Methanol | 30 | 15 | 5 |
| i | n-butanol | 20 | 15 | 70 |

After the completion of the polymerization, the amount of the polymer scale adhering to the inner wall of the polymerization vessel was measured in the same manner as in Example 2. The whiteness or initial coloration of the polymeric products is also measured in the same manner as in Example 2. The results are given in Table 6.

TABLE 6

| Experiment No. | Coating solution No. | Amount of scale ($g/m^2$) | L value |
|---|---|---|---|
| 301* | — | 450 | 73.0 |
| 302* | 21* | 330 | 71.8 |
| 303* | 23* | 40 | 71.6 |
| 304* | 39* | 15 | 68.1 |
| 305* | 40* | 0 | 72.0 |
| 306 | 25 | 0 | 72.0 |
| 307 | 28 | 0 | 72.2 |
| 308 | 29 | 2 | 72.0 |
| 309 | 30 | 1 | 72.3 |
| 310 | 32 | 0 | 72.6 |
| 311 | 33 | 4 | 72.8 |
| 312 | 38 | 0 | 72.5 |

EXAMPLES 6

(Experiment Nos. 401 to 412)

In each experiment, in a stainless polymerization vessel with an inner capacity of 1,000 liters in which a coating had been formed in the same manner as in Example 5, were charged 550 kg of water, 125 kg of styrene, 120 kg of a styrene-butadiene rubber latex (solid content: 50%), 50 kg of acrylonitrile, 2.5 kg of an emulsifying agent for polymerization of synthetic rubbers (Harima Kasei Kogyo K.K., BANDIS T-10DP), 0.1 kg of sodium hydroxide, 1.5 kg of t-dodecylmercaptan and 0.3 kg of potassium peroxodisulfate, followed by polymerization at 70° C. for 3 hours.

After the completion of the polymerization, the amount of polymer scale was measured in the same manner as in Example 2. The initial coloration of the polymeric product obtained was measured according to the following method.

Measurement of Initial Coloration

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), molded at 195° C. under a pressure of 50 to 60 $kgf/cm^2$ to prepare a test specimen. This test specimen was measured for luminosity index L in the same manner as in Example 2.

The results are given in Table 7.

TABLE 7

| Experiment No. | Coating solution No. | Amount of scale ($g/m^2$) | L value |
|---|---|---|---|
| 401* | — | 550 | 85.2 |
| 402* | 2* | 480 | 83.6 |
| 403* | 39* | 9 | 79.5 |
| 404* | 40* | 4 | 79.9 |
| 405 | 24 | 28 | 84.0 |
| 406 | 26 | 3 | 84.1 |
| 407 | 27 | 1 | 83.9 |
| 408 | 31 | 10 | 84.4 |
| 409 | 34 | 2 | 85.0 |
| 410 | 35 | 0 | 84.7 |
| 411 | 36 | 3 | 84.0 |
| 412 | 37 | 1 | 84.3 |

We claim:

1. A polymer scale preventive agent for use in polymerization of a monomer having an ethylenically unsaturated double bond, comprising:

(A) at least one compound selected from the group consisting of 1,2-diaminonaphthalene, 1,4-diaminonaphthalene, 1,5-diaminonaphthalene, 1,8 -diaminonaphthalene, 2,3-diaminonaphthalene, 2,6-diaminonaphthalene, and 2,7-diaminonaphthalene, (B) a hydroxynaphthoquinone selected from the group consisting of 2-hydroxy-1,4-naphthoquinone, 2-hydroxy-3-methyl-1,4-naphthoquinone, 2-hydroxy-3-ethyl-1,4-naphthoquinone, 2-hydroxy-6,7-dimethyl-1,4-naphthoquinone, 2-hydroxy-6-methyl-1,4-naphthoquinone, 6-methyl-2-hydroxy-3-ethyl-1,4-naphthoquinone, 6-chloro-2-hydroxy-1,4-naphthoquinone, 6-chloro-2-hydroxy-3-methyl-1,4-naphthoquinone 5,8-dihydroxy-1,4-naphthoquinone, and 2,6-dihydroxy-1,4-naphthoquinone, (C) an acid, and (D) a silica sol, wherein said silica sol contains dispersed silica having a particle diameter of 2–20 nm.

2. The polymer scale preventive agent according to claim 1, wherein the component (B) comprises at least one compound selected form the group consisting of 2-hydroxy-1,4-naphthoquinone, 6-chloro-2-hydroxy-1,4-naphthoquinone and 5,8-dihydroxy-1,4-naphthoquinone.

3. The polymer scale preventive agent according to claim 1, wherein the component (C) comprises at least one acid selected from the group consisting of phosphoric acid, oxalic acid, acetic acid, molybdic acid, tungstic acid, phosphomolybdic acid, phosphotungstic acid, silicomolybdic acid, silicotungstic acid, phytic acid and tannic acid.

4. The polymer scale preventive agent according to claim 1, wherein the amount of the component (B) is in the range from 1 to 10,000 parts by weight, and the amount of the component (C) is in the range from 0.01 to 5,000 per 100 parts by weight of the component (A).

5. The polymer scale preventive agent according to claim 1, which is in a liquid state in which the components (A), (B) and (C) are dissolved or dispersed in a solvent.

6. The polymer scale preventive agent according to claim 5, wherein the total concentration of the components (A), (B) and (C) is in the range from 0.001 to 5% by weight.

7. The polymer scale preventive agent according to claim 1, wherein the component (D) is dispersed in at least one solvent selected from the group consisting of water and alcohols.

8. The polymer scale preventive agent according to claim 1, wherein the component (D), contains 10 to 50% by weight.

9. The polymer scale preventive agent according to claim 1, wherein the amount of the component (D) is in the range from 1 to 10,000 parts by weight per 100 parts by weight of the total of the components (A), (B) and (C).

* * * * *

UNITED STATES PATENT AND TRADEMARK OFFICE

CERTIFICATE OF CORRECTION

PATENT NO. : 5,411,675

DATED : May 2, 1995

INVENTOR(S) : Masahiro USUKI, et al.

It is certified that error appears in the above-indentified patent and that said Letters Patent is hereby corrected as shown below:

On the title page, Item [21], the Application Number should read:

--07/950,226--

Signed and Sealed this

Fourth Day of July, 1995

Attest:

BRUCE LEHMAN

Attesting Officer

Commissioner of Patents and Trademarks